Figure 5:
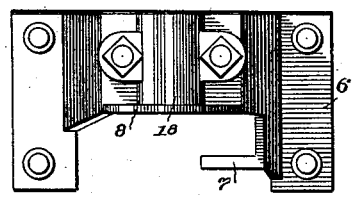

(No Model.)  3 Sheets—Sheet 1.
C. H. MASON.
HORSE HAY RAKE.
No. 572,647.  Patented Dec. 8, 1896.
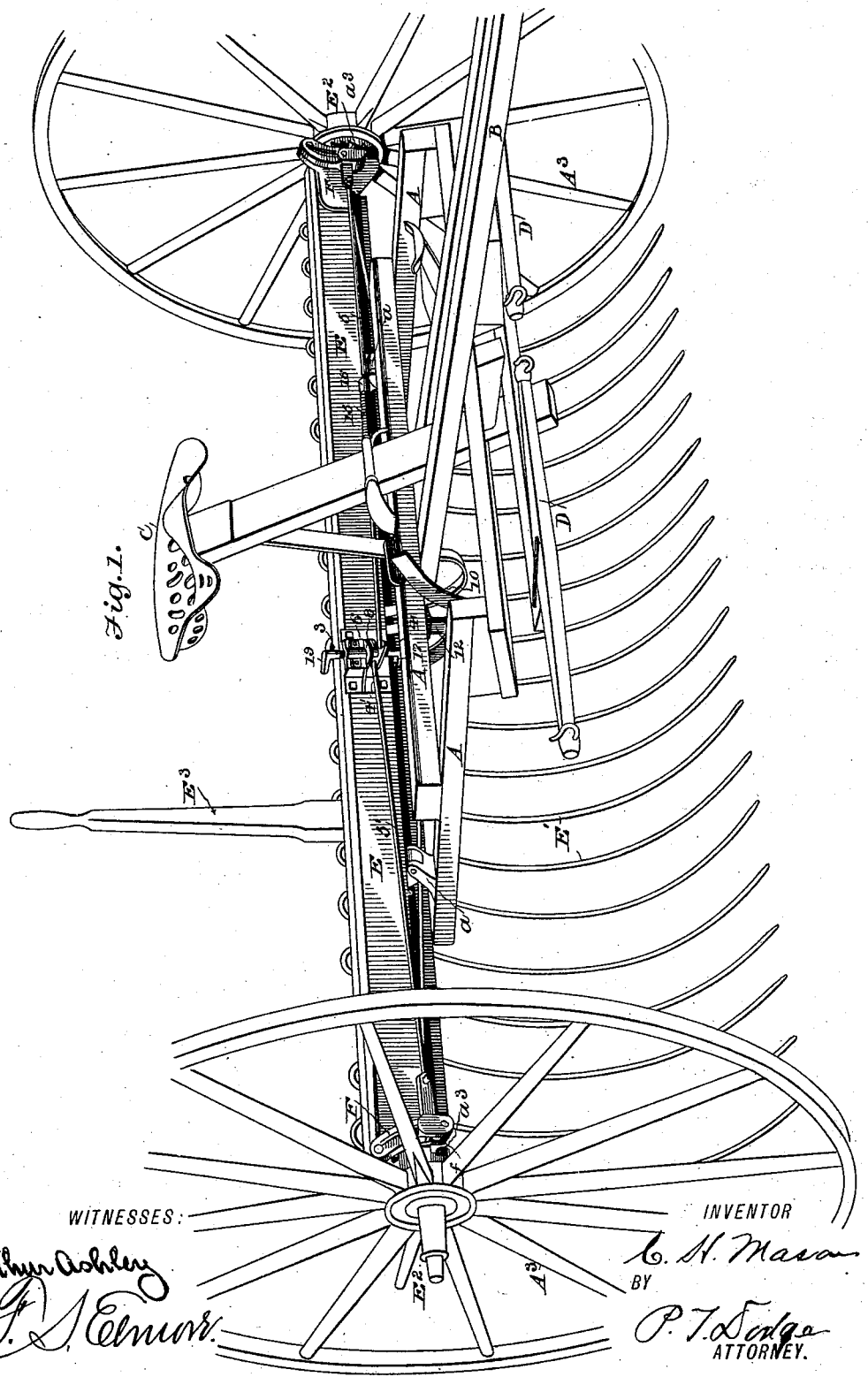
WITNESSES:
Arthur Ashley
J. J. Elmore
INVENTOR
C. H. Mason
BY
P. J. Dodge
ATTORNEY.

(No Model.) 3 Sheets—Sheet 2.
C. H. MASON.
HORSE HAY RAKE.
No. 572,647. Patented Dec. 8, 1896.
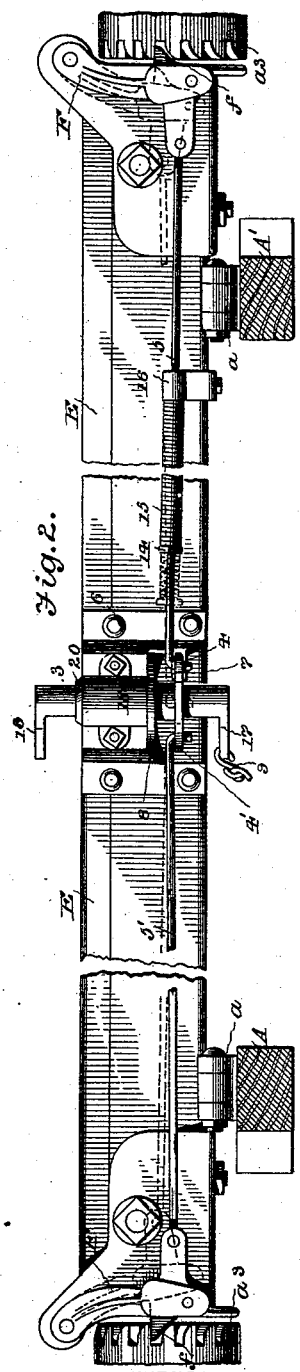
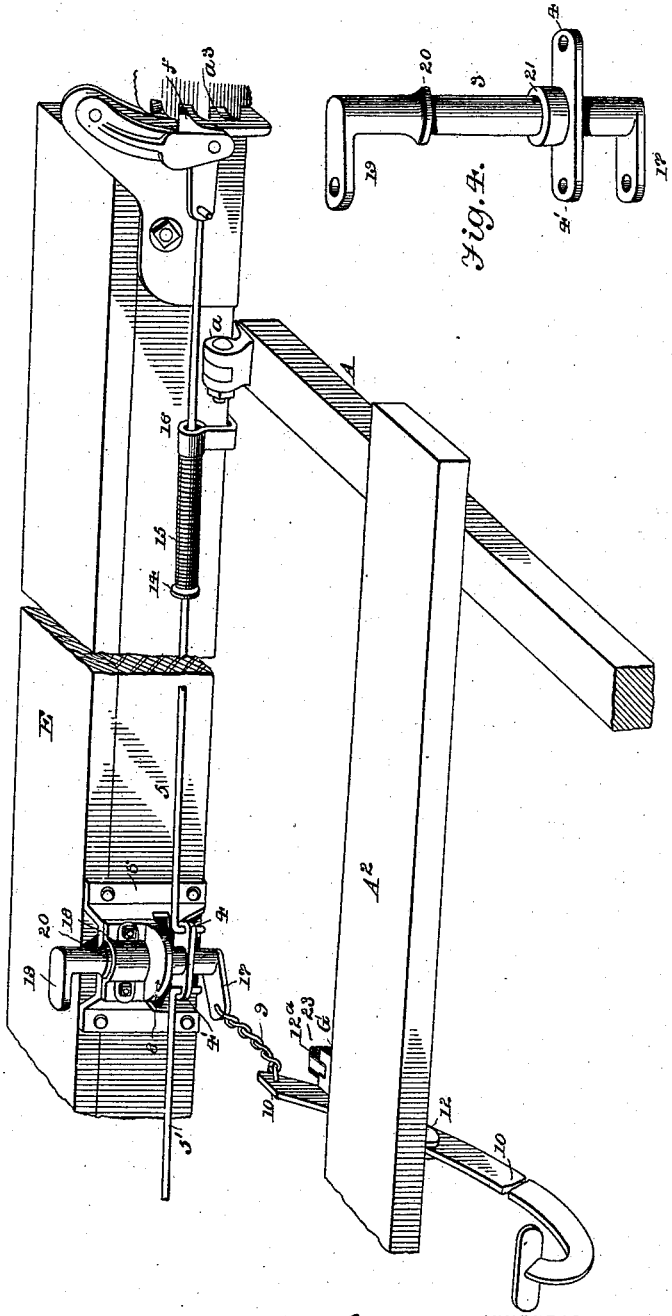
WITNESSES:
Arthur Ashley
F. S. Edmore.
INVENTOR
C. H. Mason
BY
Phil. T. Dodge
ATTORNEY.

(No Model.) 3 Sheets—Sheet 3.

C. H. MASON.
HORSE HAY RAKE.

No. 572,647. Patented Dec. 8, 1896.

WITNESSES:
Arthur Ashley
G. J. Elmore

INVENTOR
C. H. Mason
BY
Phil T. Dodge
ATTORNEY.

UNITED STATES PATENT OFFICE.

CHARLES H. MASON, OF SHORTSVILLE, NEW YORK, ASSIGNOR TO THE EMPIRE DRILL COMPANY, OF NEW YORK.

HORSE HAY-RAKE.

SPECIFICATION forming part of Letters Patent No. 572,647, dated December 8, 1896.

Application filed June 24, 1896. Serial No. 596,723. (No model.)

*To all whom it may concern:*

Be it known that I, CHARLES H. MASON, of Shortsville, county of Ontario, and State of New York, have invented a new and useful Improvement in Horse Hay-Rakes, of which the following is a specification.

This invention relates to horse hay-rakes; and it consists of an improved mechanism by which at the will of the operator the raking-teeth are lifted from the ground to dump the load by the forward movement of the ground-wheels.

The invention also consists of the details of construction and combination of parts hereinafter described and claimed.

The object of my invention is to provide a suitable device for bringing the pawl and the ratchet of the dumping device of a hay-rake into engagement with each other. Said device consists, essentially, of a rock-shaft or its equivalent having arms projecting therefrom through holes in which pass the ends of the rods connecting the device with the dumping mechanism at each end of the machine. (By "dumping mechanism" I refer to the pawl and ratchet and the accompanying parts.) Said shaft is constrained to simple rotary rocking motion by being held in a metal box and by collars either formed integrally with said shaft or attached to it or by pins, cotters, or projections passing through or formed integrally with said shaft, said collars preventing motion in the direction of the axis of the shaft.

The further object of my invention is to provide a suitable device by which a movement of the hand or foot is communicated to an arm fastened upon or formed integrally with the rock-shaft, imparting to it and to the arms connected with it a rotary motion, which motion shall, by suitable constrainment of the elemental parts of the mechanism, be converted to practically straight-line motion, by which the pawls shall be caused to engage with the ratchets. Said device consists, essentially, of a suitably-formed lever with adequate support, a suitable arm fastened upon or formed integrally with the rock-shaft, and a rod or chain or the equivalent of the same which shall connect the said lever with the said arm.

The further object of my invention is to provide a suitable device by which the load on the teeth of a hay-rake having been released the ratchets shall be automatically disengaged, allowing the teeth to return to their working position. Said device consists, essentially, of an abutment in the form of a roller or pin mounted upon a suitable support, so situated with respect to the axis of rotation of the teeth and to the axis of rotation of the rock-shaft that at the time when the teeth shall have been raised sufficiently high to clear the windrow an arm projecting from the rock-shaft shall strike the roller or pin, causing a motion of the shaft opposite in direction to that previously specified, causing the pawls to become disengaged from the ratchets and allowing the teeth to return to their normal position.

The further object of my invention is to provide a suitable device by which the rock-shaft shall be constrained to move through a certain arc and only through such arc. Said device consists, essentially, of a suitable stop lug or projection so situated in relation to the two arms which carry the connecting-rods that, the pawls and ratchets being disengaged, an edge of one of the arms shall lie against said lug or projection, preventing further rotation of the rock-shaft in the direction of the force exerted by the spring hereinafter described. The arms having rotated with the shaft sufficiently past the point where the center line of the arms and those of the connecting-rods form a straight line, a suitable stop lug or projection shall prevent further rotation, thus forming a three-point lock.

The further object of my invention is to provide a suitable device by which the connecting-rods shall be automatically held in their respective holes of the arms. Said device shall consist, essentially, of so arranging the connection that the rods shall pass between the arms and a disk or plate either fastened to or formed integrally with other portions of the mechanism, said disk completely covering the path of the end of the outmoving arm and at a distance from it somewhat less than the space required to disconnect the elements.

The further object of my invention is to provide a suitable device by which the pawls and ratchets having been disengaged they shall so remain until engaged by the operation of the engaging device before specified or its equivalent. Said device consists, essentially, of a spring coiled around one of the connecting-rods and between two collars, one of which is fastened to or formed integrally with said rod and the other is loose upon the rod but fastened to or formed integrally with the frame of the machine or other suitable part outside of the connecting-rod.

The invention will be hereinafter fully described, and pointed out in the claims.

Figure 6:
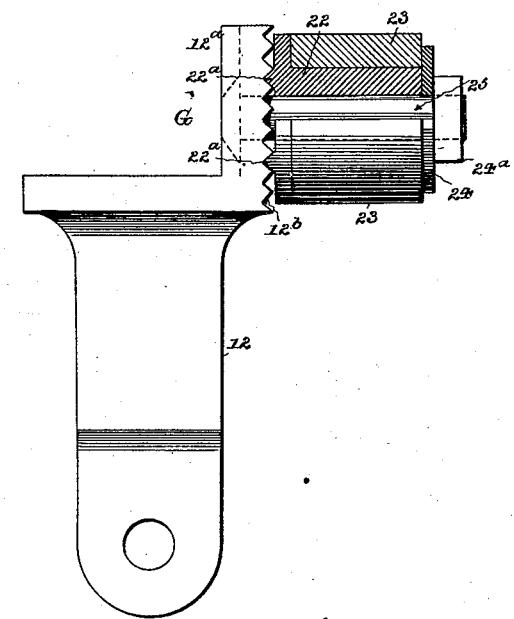
Figure 7:
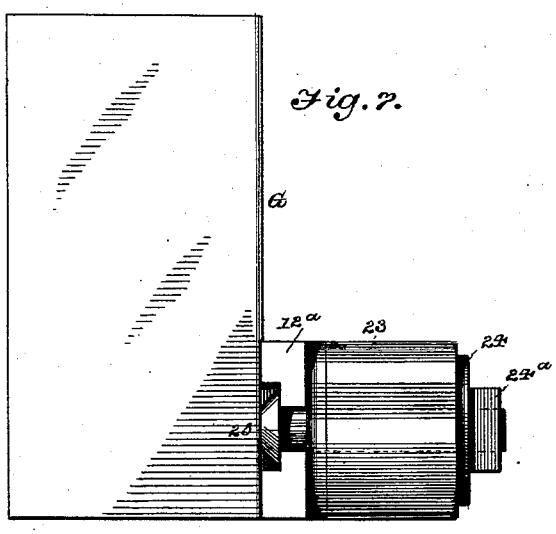
Figure 8:
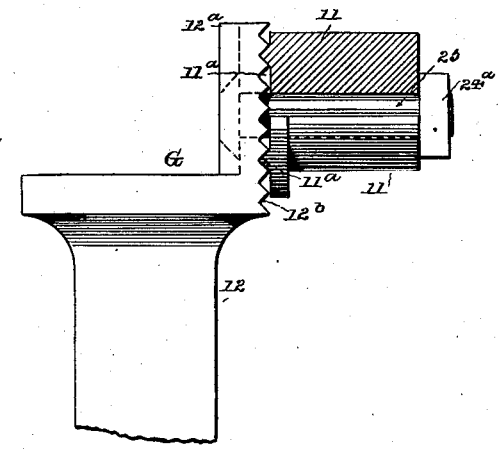

Referring to the drawings, Figure 1 is a perspective of a horse hay-rake with my improvements applied and the pawls disconnected from the ratchets. Fig. 2 is a sectional plan view, the full lines showing the rock-shaft adjusted to hold the pawls in engagement with the ratchets and the dotted lines showing the position of the rock-shaft when the pawls are disengaged. Fig. 3 is a perspective showing the position of the parts when the releasing-arm at the upper end of the rock-shaft is about to engage the abutment, whereby automatic retraction or disengagement of the pawls from the ratchet is effected. Fig. 4 is a perspective of the rock-shaft removed. Fig. 5 is a front elevation of the rock-shaft bearing and its stop lug or projection. Figs. 6 and 7 are sectional side and plan views of the abutment for automatically operating the rock-shaft. Fig. 8 is a sectional side elevation of a modified form of abutment.

A is the usual framing, to which the pole B (or thills) and seat C and draft devices D are secured.

E is the rocking rake-head, hinged at its lower forward edge to the rear ends of the side bars A' A' of the frame A by means of the hinges $a\ a$.

The rake-head or rocking beam E, to which the rake-teeth E' are secured, is provided at its ends with stud-axles $E^2\ E^2$, on which the ground-wheels $A^3$ are mounted. The rake-head E is provided with the usual upwardly-projecting hand-lever $E^3$, by means of which the rake-head may be rocked by hand to elevate the rake-teeth.

The above parts are constructed as usual and need not be further described.

The hubs of the wheels $A^3$ are provided with ratchet-wheels $a^3$, either integral therewith or secured thereto, the front edges of these ratchet-teeth being straight and their rear edges being curved, as clearly shown in the drawings.

3 is a vertical rock-shaft mounted in a box or bearing 6, bolted to the front side of the rake-head E at the middle thereof and adapted to rotate about a quarter-revolution in said box or bearing. The shaft 3 is held against endwise movement in its bearing in any suitable manner, but the annular shoulders 20 21, above and below the bearing 6, are shown as a simple means for such purpose.

The shaft 3 is held in its bearing 6 by means of a removable cap-plate 18, bolted to the main portion of the box, and the lower end of this cap is provided with a forwardly-extending horizontal flange 8 for a purpose to be presently described.

The rock-shaft is provided just below the flange 8 with oppositely-projecting arms 4 4', having vertical apertures at or near their ends. Below these arms the shaft is formed with what may be termed for convenience a "transverse setting-arm" 17, while the upper end of the shaft is provided with a transverse releasing-arm 19.

The rock-shaft 3 is for the purpose of setting and releasing any suitable clutch mechanism for clutching or locking the ground-wheels to the rake-head when the rake is to be dumped. I have shown this clutching or dumping mechanism as consisting in the before-mentioned ratchets $a^3$ and two pivoted depending pawls F F at the ends of the forward side of the rake-head E, said pawls being connected to the arms 4 4' of shaft 3 by means of the rods 5 5', respectively, the inner ends of the rods 5 5' being bent downwardly and passed through the apertures in said arms.

The bent ends of rods 5 5' extend beneath the overhanging plate or flange 8 and are held against displacement thereby, and may be readily disengaged from said arms upon removal of the cap 18 and its plate 8. One of the rods 5 5' slides freely through a stationary guide or bearing 16, secured to the rake-head or beam E, and is provided between said guide or bearings and the shaft 3 with a fixed stop or collar 14. A spiral spring 15 encircles the rod between the guide 16 and stop 14 and normally presses the rod 5 inwardly, so as to hold the pawls F away from the ratchets $a^3$. These pawls are each provided with an inclined spring-projected tooth $f$, the upper end of which is straight to seat firmly on the straight front edges of the ratchet-teeth, and the outer edges of the teeth $f$ are inclined so as to cause the teeth to yield inwardly when the curved edges of the ratchet-teeth bear thereagainst, as would be the case during a rearward rotation of the ground-wheels in backing, &c. This construction of the pawl and ratchet-teeth also allows of a certain and positive engagement therebetween, as will be readily seen.

G is an angle-bracket bolted to the cross-bar $A^2$ of the frame A, with its lower member 12 extending downwardly in the form of a fork, while its vertical slotted member $12^a$ extends up behind the said cross-bar and receives in its slot the headed end of a transverse rearwardly-extending bolt 25, on which is mounted the abutment against which the releasing-arm 19 of the rock-shaft 3 strikes when the rake is dumped or overturned, as shown in Fig. 3.

In Fig. 6 the abutment is shown as comprising a sleeve or tube 22, mounted on the bolt 25, with its flanged inner end having one or more teeth 22ª engaging the teeth 12ᵇ to prevent rotation, and on this sleeve or tube is mounted a roller 23, which is held in place by a washer 24 and a nut 24ª on the bolt. This abutment-forming roller 23 will rotate when struck by the releasing-arm 19 and thus lessen friction, &c. In Fig. 8, however, the abutment-forming roller 11 is held stationary on the bolt 25 by means of one or more teeth 11ª engaging the teeth 12ᵇ; but by loosening the nut and turning the roller 11 a new surface may be brought into play whenever the roller becomes worn.

A longitudinally-extending curved foot-lever 10 is pivoted between its ends in the fork 12, and its rear end is connected with the setting-arm 17 of rock-shaft 3 by means of a chain 9 or otherwise, so that when the driver depresses the front end of the foot-lever its rear end will exert a forward pull on the setting-arm 17 and draw it forwardly, so as to rotate the rock-shaft from the position shown in Fig. 1 to the position shown in full lines in Figs. 2 and 3. When the shaft is so rotated or rocked, its releasing-arm 19 and arms 4 4' will extend transversely of the machine, and the arm 19 will then lie directly in the path of the releasing-abutment. (See Fig. 3.) Moreover, the ends of the arms 4 4' will lie at opposite sides of the axis of the shaft 3, and as the spring 15 will have been compressed it will tend to continue the rotation of the shaft in the direction in which it was rotated by the foot-lever. This action will be prevented, however, by means of the stop-lug 7, formed on the lower end of the bearing or box 6 and against the forward edge of which lug the arm 4 is now held. The arms 4 4' in thus turning transversely of the machine will, of course, have forced the pawls F F outwardly into engagement with the ratchet-wheels, so that as the machine moves forward the ground-wheels will rock the rake-head forwardly and raise its teeth, thereby causing the load to be dumped. This forward rocking of the rake-head will continue till the releasing-arm 19 strikes the abutment 23, (or 11,) when the said arm will be forced rearwardly, thereby reversing the movement of the shaft 3, which movement will be quickened by the expansion of the spring 15 from its compressed position. The rotation of the shaft 3 will continue till the arm 4' strikes the inner end of the stop-lug 7, as shown in dotted lines, Fig. 2, said reverse rotation of shaft 3 causing the arms 4 4' and their ends 5 5' to quickly release the pawls F F from the ratchet-wheels $a^3$. The expansive force of the springs 15 will now hold the parts in this position until the foot-lever 10 is again depressed.

It will be understood that I do not confine myself to a pawl-and-ratchet clutch or connection between the wheels and shaft 3, as the shaft may be made to operate some other form of clutch without departing from the scope of my invention.

If desired, a single pawl and ratchet may be used instead of two, as shown, though better results will follow if two are used—one for each ground-wheel.

Having thus described my invention, what I claim is—

1. The combination with the dumping hay-rake having clutches for connecting its rocking head with the ground-wheels, of the box or bearing having a cap or cover provided with a horizontal flange and a stop-lug on the box below the flange, of the vertical rock-shaft journaled in said box or bearing and having oppositely-projecting apertured arms under the said flange and limiting the rotation of the shaft by engaging the stop-lug in the manner described, oppositely-extending spring-pressed rods having bent inner ends held in the apertured arms by said horizontal flange, a releasing-arm at the upper end of the shaft, an abutment on the frame in front and in the path thereof, a setting-arm at the lower end of the shaft and a foot-lever connecting to said setting-arm, substantially as set forth.

2. In a dumping hay-rake the combination of the box or bearing having a cap provided with a horizontal flange at its lower end, a stop-lug below the flange, a vertical rock-shaft mounted in said box and having clutch-operating arms under said flange and in the plane of the stop-lug, a setting-arm at the lower end of the shaft and a releasing-arm at its upper end, substantially as set forth.

3. A dumping hay-rake consisting in the frame A, the rake-head hinged thereto and provided with ground-wheels, the angle-bracket G secured to frame A and having a depending member and a rearwardly-projecting abutment, a foot-lever pivoted to said depending member, a vertical rock-shaft on the front side of the rake-head and having a bearing or box provided with a stop-lug 7; said shaft having oppositely-projecting arms 4, 4', in the plane of the stop-lug, a releasing-arm 19 at its upper end to engage the abutment and a setting-arm 17 at its lower end connected to the rear end of the foot-lever, rods extending from the arms 4, 4', to the ends of the rake-head, pawls pivoted to the rake-head and connected to said rods and ratchet-wheels on the ground-wheels for engagement by said pawls to dump the rake, substantially as set forth.

4. The box or bearing 6 formed at one side of its lower end with an inwardly-projecting stop-lug 7 and having a cap 18 bolted to its front side and provided at its lower edge with the horizontal flange 8, substantially as set forth.

In testimony whereof I hereunto set my hand, this 22d day of May, 1896, in the presence of two attesting witnesses.

CHARLES H. MASON.

Witnesses:
HENRY O. KLINCK,
MILAN E. GOODRICH.